United States Patent [19]

Gallucci et al.

[11] Patent Number: 5,122,551

[45] Date of Patent: Jun. 16, 1992

[54] GLASS FILLED COPOLYETHER-POLYESTER COMPOSITIONS

[75] Inventors: Robert R. Gallucci, Mt. Vernon, Ind.; Kelvin T. Okamoto, Wilmington, Del.

[73] Assignee: General Electric Company, Pittsfield, Mass.

[21] Appl. No.: 566,008

[22] Filed: Aug. 10, 1990

Related U.S. Application Data

[63] Continuation-in-part of Ser. No. 523,165, May 14, 1990, abandoned.

[51] Int. Cl.$^5$ ............................................. C08K 9/04
[52] U.S. Cl. ....................................................... 523/217
[58] Field of Search ............... 523/209, 217, 213, 214, 523/466; 524/605

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,368,995 | 2/1968 | Furukawa et al. | 260/40 |
| 3,671,487 | 6/1972 | Abolins | 260/873 |
| 3,778,283 | 12/1973 | Henkel Cie | 260/40 |
| 3,814,725 | 6/1974 | Zimmerman et al. | 260/40 |
| 3,962,174 | 6/1976 | Berardinelli | 260/40 |
| 4,113,692 | 9/1978 | Wambach | 260/40 |
| 4,124,561 | 11/1978 | Phipps, Jr. et al. | 260/40 |
| 4,184,997 | 1/1980 | Wu | 525/421 |
| 4,195,140 | 2/1980 | Lord Corp. | 525/421 |
| 4,276,208 | 6/1981 | Ogawa et al. | 260/28 |
| 4,394,475 | 7/1983 | Temple et al. | 524/262 |
| 4,469,851 | 10/1984 | Charles et al. | 525/421 |
| 4,487,797 | 12/1984 | Watson | 428/268 |
| 4,539,350 | 9/1985 | Abeleen et al. | 523/527 |
| 4,568,712 | 2/1986 | Van Abeleen et al. | 524/267 |
| 4,696,960 | 1/1987 | Stamicarbon | 525/421 |
| 4,711,924 | 12/1987 | Salensky | 524/402 |
| 4,745,028 | 5/1988 | Das et al. | 428/391 |
| 4,788,251 | 7/1988 | Gen Ele. Co. | 260/75 |
| 4,990,549 | 2/1991 | Delvin et al. | 523/213 |

FOREIGN PATENT DOCUMENTS

| | | |
|---|---|---|
| 0232869 | 7/1988 | European Pat. Off. . |
| 0352486 | 8/1989 | European Pat. Off. . |
| 49031753 | 11/1979 | Japan . |
| 53106750 | 5/1981 | Japan . |
| 53106749 | 10/1981 | Japan . |
| 53051210 | 4/1982 | Japan . |
| 56116749 | 7/1985 | Japan . |
| 53143649 | 8/1989 | Japan . |
| 53144954 | 10/1989 | Japan . |
| 53144955 | 10/1989 | Japan . |
| 61091245 | 11/1989 | Japan . |
| 7325066 | 2/1991 | Japan . |
| 362827 | 10/1980 | U.S.S.R. . |
| 1592205 | 5/1984 | United Kingdom . |
| 1592668 | 5/1984 | United Kingdom . |

OTHER PUBLICATIONS

Pending—Application 07/421,581 filed Oct. 16, 1989, inventors Ann M. Delvin, Robert R. Gallucci, Keith N. Gray, Ronald M. Harris, assigned to General Electric Company.

*Primary Examiner*—Paul R. Michl
*Assistant Examiner*—Umakant Rajguru
*Attorney, Agent, or Firm*—Spencer D. Conard

[57] ABSTRACT

A glass filled copolyether-polyester resin composition is provided exhibiting improved tensile and flexural strength as well as high impact strength. The improved properties are obtained by employing a glass fiber reinforcing agent comprising an epoxy functional cyanurate or isocyanurate. The compositions are useful for making molded fiber reinforced thermoplastic articles.

17 Claims, No Drawings

GLASS FILLED COPOLYETHER-POLYESTER COMPOSITIONS

This is a continuation-in-part of Ser. No. 523,165 filed May 14, 1990 and now abandoned.

BACKGROUND OF THE INVENTION

1. Field of the Invention

The present invention relates to glass filled copolyether-polyester resin compositions and more particularly relates to thermoplastic resin compositions containing a copolyether-polyester resin and a glass fiber reinforcing agent treated with a sizing agent comprising an epoxy functional cyanurate or isocyanurate.

2. Description of Related Art

Fiber reinforced copolyether-ester compositions are known, see Wu, U.S. Pat. No. 4,184,997, which discloses fiber-reinforced polyethylene terephthalate molding compositions containing (A) about 20% to about 80% by weight of polyethylene terephthalate; (B) about 5% to about 50% by weight of a reinforcing fiber such as glass fiber; and (C) about 6% to about 60% by weight of a copolyether ester.

While fiber reinforced copolyether-polyester compositions exhibit useful characteristics, it is desirable to improve the tensile and flexural strength of such compositions for some applications.

Accordingly, one object of the present invention is to provide glass fiber reinforced copolyether-polyester compositions exhibiting enhanced levels of tensile strength and flexural strength.

SUMMARY OF THE INVENTION

The present invention involves a glass fiber reinforced copolyether-polyester copolymer composition containing a glass fiber reinforcing agent treated with a sizing agent comprising a di- or tri- epoxy functional cyanurate or isocyanurate. The compositions exhibit enhanced levels of tensile strength and flexural strength. The compositions are useful for making molded articles.

DETAILED DESCRIPTION OF THE INVENTION

Copolyetheresters are well known and are available from several sources including the Hytrel$\phi$ resins from E. I. DuPont and the LOMOD ® resins from General Electric Company and are described in U.S. Pat. Nos. 3,023,192; 3,651,014; 3,763,109; 3,766,146; 3,784,520; 3,801,547; 3,907,926; 4,156,774; 4,184,997; 4,264,761 and 4,355,155, among others; all incorporated herein by reference.

Suitable thermoplastic copolyetheresters (A) for use in this invention include both random and block copolymers. In general, these are prepared by conventional esterification/polycondensation processes from (a) one or more diols, (b) one or more dicarboxylic acids, (c) one or more long chain ether glycols, and optionally, (d) one or more caprolactones or polycaprolactones.

Diols(a) which can be used in the preparation of the copolyetheresters include both saturated and unsaturated aliphatic and cycloaliphatic dihydroxy compounds as well as aromatic compounds. These diols are preferably of a low molecular weight, i.e., having a molecular weight of about 300 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from about 2 to about 19 carbon atoms. Exemplary of these diols there may be given ethylene glycol; propanediol; butanediol; pentanediol; 2-methyl propanediol; 2,2-dimethyl propanediol; hexanediol; decanediol; 2-octyl undecanediol; 1,2-, 1,3- and 1,4- dihydroxy cyclohexane; 1,2- 1,3- and 1,4-cyclohexane dimethanol; etc. Especially preferred are 1,4-butanediol and mixtures thereof with hexanediol or butenediol.

Aromatic diols suitable for use in the preparation of the thermoplastic elastomers are generally those having from about 6 to about 19 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl)propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, most preferably at least 80 mole %, based on the total diol content, be the same diol. As mentioned above, the preferred thermoplastic elastomers are those in which 1,4-butanediol is present in a predominant amount.

Dicarboxylic acids (b) which are suitable for use in the preparation of the copolyetheresters include aliphatic cycloaliphatic, and/or aromatic dicarboxylic acids. These acids are preferably of a low molecular weight, i.e., having a molecular weight of less than about 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include ester and ester-forming derivatives, such as acid halides and anhydrides. Additionally, the dicarboxylic acids may contain any substituent group(s) or combinations which do not substantially interfere with the polymer formation and use of the polymer in the practice of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used are sebacic acid; 1,2-cyclohexane dicarboxylic acid; 1,3-cyclohexane dicarboxylic acid;

1,4-cyclohexane dicarboxylic acid; adipic acid; glutaric acid; succinic acid; oxalic acid; azelaic acid; diethylmalonic acid; allylmalonic acid; dimer acid; 4-cyclohexene-1,2-dicarboxylic acid; 2-ethylsuberic acid; tetramethylsuccinic acid; cyclopentane dicarboxylic acid; decahydro-1, 5-naphthalene dicarboxylic acid; 4,4'-bicyclohexyl dicarboxylic acid; decahydro-2,6-naphthalene dicarboxylic acid; 4,4 methylenebis-(cyclohexane carboxylic acid); 3,4-furan dicarboxylic acid; and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic; phthalic and isophthalic acids; bi-benzoic acid; substituted dicarboxy compounds with two benzene nuclei such as bis(p-carboxyphenyl) methane; oxybis(benzoic acid); ethylene-1,2-bis-(p-oxygenzoic acid); 1,5-naphthalene dicarboxylic acid; 2,6-naphthalene dicarboxylic acid; 2,7-naphthalene dicarboxylic acid; phenanthrene dicarboxylic acid; anthracene dicarboxylic acid; 4,4'-sulfonyl dibenzoic acid, and halo and $C_1$-$C_{12}$ alkyl; alkoxy; and aryl ring substitution derivatives thereof. Hydroxy acids such as P(P-hydroxyethoxy)benzoic acid can also be used provided an aromatic dicarboxylic acid is also present.

Preferred dicarboxylic acids for the preparation of the copolyetheresters are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8-16 carbon atoms are preferred, particularly the benzene dicarboxylic acids, i.e., phthalic, terephthalic and isophthalic acids and their dimethyl ester derivatives. Especially preferred is dimethyl terephthalate.

Finally, where mixtures of dicarboxylic acids are employed, it is preferred that at least about 60 mole %, preferably at least about 80 mole %, based on 100 mole % of dicarboxylic acid (b) be of the same dicarboxylic acid or ester derivative thereof. As mentioned above, the preferred copolyetheresters are those in which dimethylterephthalate is the predominant dicarboxylic acid.

Preferred polyester segments will show a crystalline behavior with a distinct melting point.

Suitable long chain ether glycols (c) which can be used in the preparation of the thermoplastic elastomers are preferably poly(oxyalkylene)glycols and copoly(oxyalkylene)glycols of molecular weight of from about 400 to 12000. Preferred poly(oxyalkylene) units are derived from long chain ether glycols of from about 900 to about 4000 molecular weight and having a carbon-to-oxygen ratio of from about 1.8 to about 4.3, exclusive of any side chains.

Representative of suitable poly(oxyalkylene)-glycols are poly(ethylene etherglycol); poly(propylene ether)-glycol; poly(tetramethylene ether)glycol; random or block copolymers of ethylene oxide and propylene oxide, including ethylene oxide end capped poly(propylene ether)glycol and predominately poly(ethylene ether)backbone, copoly(propylene ether-ethylene ether)glycol; and random or block copolymers or tetrahydrofuran with minor amounts of a second monomer such as ethylene oxide, propylene oxide, or methyltetrahydrofuran (used in proportions such that the carbon-to-oxygen ratio does not exceed about 4.3). Polyformal glycols prepared by reacting formaldehyde with diols such as 1,4-butanediol and 1,5-pentanediol are also useful. Especially preferred poly(oxyalkylene)glycols are poly(propylene ether)-glycol, poly(tetramethylene ether)glycol and predominantly poly(ethylene ether) backbone copoly(propylene ether-ethylene ether)-glycol.

Optionally, these copolyetheresters may have been incorporated therein one or more caprolactones or polycaprolactones.

Caprolactones (d) suitable for use herein are widely available commercially, e.g., from Union Carbide Corporation and Aldrich Chemicals. While epsilon caprolactone is especially preferred, it is also possible to use substituted caprolactones wherein the epsilon caprolactone is substituted by a lower alkyl group such as a methyl or ethyl group at the alpha, beta, gamma, delta or epsilon positions. Additionally, it is possible to use polycaprolactone, including homopolymers and copolymers thereof with one or more components, as well as hydroxy terminated polycaprolactone, as block units in the novel copolyetheresters of the present invention. Suitable polycaprolactones and processes for their production are described in, for example, U.S. Pat. Nos. 3,761,511; 3,767,627; and 3,806,495 herein incorporated by reference.

In general, suitable copolyetheresters elastomers (A) are those in which the weight percent of (c) long chain ether glycol component or the combined weight percent (c) long chain ether glycol component and (d) caprolactone component in the copolyetheresters is from about 5 to about 70 weight percent. Preferred compositions are those wherein the weight percent of (c) or (c) and (d) is from about 10 to about 50 weight percent. Where both (c) long chain ether glycol and (d) caprolactone are present, each will comprise from about 2 to about 50 percent by weight, preferably from about 5 to about 30 percent by weight, of the copolyetheresters.

As described above, the copolyetheresters may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference. Additionally, these compositions may be prepared by such processes and other known processes to effect random copolymers, block copolymers or hybrids thereof wherein both random and block units are present. For example, it is possible that any two or more of the foregoing monomers/reactants may be prereacted prior to polymerization of the final copolyetheresters. Alternatively, a two-part synthesis may be employed wherein two different diols and/or dicarboxylic acids are each prereacted in separated reactors to form two low molecular weight prepolymers which are then combined with the long chain ether glycol to form the final tri-block copolyetheresters.

The preferred copolyether ester is a copolyetherpolyester block copolymer. The preferred copolyether ester resin consists essentially of (a) long-chain ester units having the formula:

(I)

wherein G is the divalent radical remaining after removal of the terminal hydroxyl groups from a poly- (alkylene oxide) glycol having a number-average molecular weight of about 400 to about 6000; and R is the divalent radical remaining after removal of the carboxyl groups from a dicarboxylic acid; and (b) short-chain ester units having the formula:

(II)

wherein D is the divalent radical remaining after removal of the hydroxyl groups from a low molecular weight diol having a molecular weight of less than about 250; and R is as defined above; with the proviso that the short-chain ester units constitute about 40% to about 90% by weight of the polyether-ester, and the long-chain ester units constitute about 10% to about 60% by weight of the copolyether-ester.

The copolyether ester resin may be a polyetheresterimide resin. Polyether ester imides are well known having been described in numerous publications and patents including for example, Honore et al., "Synthesis and Study of Various Reactive Oligomers and of Poly(ester-imide-ether)s", European Polymer Journal Vol. 16, pp. 909–916, Oct. 12, 1979; and in Kluiber et al., U.S. Pat. No. 3,274,159 and Wolfe Jr., U.S. Pat. Nos. 4,371,692 and 4,371,693, respectively.

Thermoplastic polyetherimide ester elastomers comprised of the reaction products of (a) a diol, (b) a dicarboxylic acid, (c) a high molecular weight poly(oxyalkylene)diamine, and (d) a tricarboxylic acid or its derivatives are known and are described in U.S. Pat. Nos. 4,544,734 and 4,556,708 to McCready and in U.S. Pat. No. 4,556,688 to McCready et al. These polyetherimide esters exhibit excellent stress-strain properties, low tensile set, high melting temperatures, and/or excellent strength/toughness characteristics as well as superior flexibility which are especially suitable for molding and extrusion applications.

Polyetherimide ester resins are also set out in U.S. Pat. Nos. 4,552,950; 4,556,705; and 4,732,947; which are incorporated herein by reference.

Thermoplastic polyetherester imides are known having been described in U.S. Pat. No. 4,371,692, which is incorporated herein by reference. These polymers are the reaction product of a diol, a polyoxyalkylene glycol and a diimide diacid which is the reaction product of an aromatic diamine and trimellitic anhydride.

The copolyester ether resin component is preferably present in the composition from about 10% to 99% by weight based on the total weight of the composition, more preferably from 40% to 99% by weight thereof, even more preferably from 50% to 96% by weight thereof, and most preferably about 70% by weight thereof. When resin blends are employed, preferably the copolyether ester resin is present at a level of at least 20% by weight based on the total weight of thermoplastic resin in the composition, more preferably at a level of at least 50% by weight based on the total weight of thermoplastic resin in the composition, and most preferably at a level of at least 80% by weight based on the total weight of thermoplastic resin in the composition.

The copolyetheresters may be blended with from 5% to 75% by weight crystalline polyesters, i.e., PBT, PET, PCT (polycyclohexane dimethanol terephthalate), etc., based on the total weight of resin in the composition.

The reinforcing agent is filamentous glass having a particular sizing agent thereon. The filamentous glass to be employed in the reinforcing agent in the present compositions is well known to those skilled in the art and is widely available from a number of manufacturers. For compositions ultimately to be employed for electrical uses, it is preferred to use fibrous glass filaments comprised of line-aluminum borosilicate glass that is relatively sodium free. This is known as "E" glass. However, other glass compositions are useful. All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 0.00012 to about 0.00075 inch, but this is not critical to the present invention. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur.

Essential to the present invention is that the glass fibers are treated with a sizing agent comprising an epoxy functional, preferably a di- or tri- epoxy functional, cyanurate or isocyanurate. Preferably the sizing agent is present at a level of from 0.01% to 2.0% by weight based on the total weight of said glass fiber reinforcing agent.

The glass fiber coating may optionally contain other materials to improve bonding of the epoxy functional cyanurates and isocyanurates to the glass fiber. Functionalized silanes especially alkoxy silanes may be useful in this regard. Illustrative are aminopropyl triethoxy silane, glycidyl propyl trimethoxy silane, (3,4-epoxy cyclohexyl) ethyl triethoxy silane, mercaptopropyl silane, aminoethyl aminopropyl alkoxy silane and ureidoalkyl triethoxy silanes. Most preferred are aminopropyl triethoxy silane and glycidylpropyl triethoxy silane.

The isocyanurate and cyanurate functionalization are epoxy groups. For example, glycidyl, epoxy propyl and epoxy cyclohexyl. The most preferred sizing agent contains triglycidyl isocyanurate (TGIC).

The epoxy functionalized cyanurate or isocyanurate, the functionalized silane and the glass fiber are thought to chemically react during the coating and annealing process to give the modified glass fibers of the invention. However, the inventors do not with to be bound by any theory.

The glass fiber coating may also contain film forming materials known to those skilled in the art, which will stick the individual fibers into bundles to facilitate the handling of the fibers and blending them with the resin prior to melt mixing. These film forming ingredients impart good glass strand integrity on the fibers, i.e. resistance to forming "fuzz balls". Examples of film forming additives are starches, epoxy resin, polyvinyl acetate, unsaturated polyesters, polyurethane, polyvinyl pyrollidone, phenoxy resins, polyvinyl ether copolymers and the like. The preferred film formers are soluble in water or form stable emulsions, do not cause unfavorable interactions with the thermoplastic copolyether-polyester resin, are stable under melt processing conditions and give fibers with good integrity.

It is also contemplated herein that the glass fiber treated with sizing agent be annealed. Annealing may be carried out in a conventional annealing oven, as known to those skilled in the art, at temperatures preferably from about 200° F. to about 500° F. for from about 1 to 5 hours.

In general, the best properties will be obtained if the sized filamentous glass reinforcement agent is present at a level of from at least about 1% by weight, preferably from about 1% to about 60% by weight, and most preferably from about 25% to about 40% by weight based on the total weight of the composition.

The compositions of the present invention can include, in addition to fibrous glass reinforcement of the type described, non-glass reinforced fibers in combination therewith, such as mineral reinforcing fillers, e.g. talc, clay, silica, calcium silicate, mica, and the like.

Other ingredients, such as dyes, rubbery impact modifiers, pigments, stabilizers, plasticizers, flame retardants, drip retardants and the like can be added for their conventionally employed purposes. Illustrative flame retardant additives are disclosed in U.S. Pat. Nos. 3,833,685; 3,341,154; 3,915,926 and 3,671,487. Other flame retardants are disclosed in U.S. Pat. Nos. 3,681,281; 3,557,053; 3,830,771 and United Kingdom Patent No. 1,358,080.

Suitable rubbery impact modifiers include (a) methacrylate butadiene styrene rubber, (b) acrylate rubber, (c) acrylonitrile-styrene-acrylate rubber, (d) high rubber graft acrylonitrile-butadiene-styrene.

Generally speaking, the more important of the flame retardant compounds contain chemical elements employed for their ability to impart flame resistance, e.g., bromine, chlorine, antimony, phosphorous and nitrogen. It is preferred that the flame-retardant additive comprise a halogenated organic compound (brominated or chlorinated); a halogen-containing organic compound in admixture with a phosphorous compound or compounds containing phosphorous-nitrogen bonds or a mixture of two or more of the foregoing.

The amount of flame retardant additive used is not critical to the present invention, so long as it is present in a minor proportion based on said composition, major proportions will detract from physical properties, but at least sufficient to render the copolyether ester resin non-burning or self-extinguishing. Those skilled in the art are well aware that the amount will vary with the nature of the resin and with the efficiency of the additive. In general, however, the amount of additive will be from 0.5 to 50 parts by weight per 100 parts of resin.

The preferred halogen compounds for this invention are aromatic halogen compounds such as brominated phthalimides, brominated polystyrene, brominated aryl ethers, halogenated bisphenols polycarbonate polymers of halogenated bisphenols, brominated biphenyl, brominated terphenyl, or a compound comprising two phenyl radicals separated by a divalent alkylene or oxygen group and having at least two chlorine or bromine atoms per phenyl nucleus, and mixtures of at least two of the foregoing. Especially preferred are brominated phthalimides and polycarbonate oligomers of brominated bisphenols, alone, or mixed with antimony oxide.

The compositions of the present invention may also comprise a drip retardant agent. These are described in U.S. Pat. No. 3,671,487. Generally, the drip retardant agent comprises a polytetrafluoroethylene resin, which is commercially available or can be prepared by known processes. They are white solids obtained by polymerization of the tetrafluoroethylene in aqueous media with free radical catalysts, e.g., sodium, potassium or ammonium peroxydisulfates at 100 to 1,000 psi and at 0° C. to 200° C. and preferably 200° C. to 100° C. See Brubaker, U.S. Pat. No. 2,393,967.

The composition may further contain amounts of linear polyesters such as polyethylene terephthalate and polybutylene terephthalate in amounts of from 1% to 40% by weight based on the total weight of the composition.

The compositions of the present invention can be prepared by a number of procedures. In one way, the reinforcing glass fibers (a glass roving or a bundle of strands of glass filaments) are treated with a sizing agent of the present invention, e.g., triglycidyl isocyanurate, to substantially coat the fibers and are chopped into small pieces, e.g., one-fourth to 2 inches in length. The treated chopped glass fibers, and optionally a mineral filler, are fed into an extrusion compounder with the copolyetherester resin, and optional nucleating agent or other additive, to produce molding pellets. The reinforcing agent is thereby shortened and dispersed in a matrix of the resin coming out less than one-sixteenth of an inch long in the process. In another procedure, glass filaments are ground or milled to short lengths, treated with triglycidyl isocyanurate, and are then mixed with the copolyetherester resin and optional nucleating agent by dry blending and then either fluxed on a mill and ground, or they are extruded and chopped. In still another procedure, continuous lengths of glass roving are pretreated with a triglycidyl isocyanurate sizing agent and then drawn through a bath of melted copolyetherester resin, flame retardant additive and nucleating agent which thereby substantially coats the filaments and the resin coated treated glass strand is chopped into small cylinders, one-fourth inch or longer, to form a molding compound. The treated glass fibers can also be mixed with resin and additives and directly molded, e.g., by injection or transfer molding techniques.

In compounding should be carried out to ensure that the residence time in the machine is short, the temperature is carefully controlled, the friction heat is utilized; and an intimate blend between the resin and the reinforcement is obtained.

Although it is not essential, good results are obtained if the components are pre-compounded, pelletized and molded. Pre-compounding can be carried out in conventional equipment. For example, after pre-drying the copolyetherester resin, e.g., under vacuum at 100° C. for about 12 hours, a single screw extruder is fed with a dry blend of the components, the screw employed having a long transition section to ensure proper melting preferably at 460° F. to 480° F. at 100 rpm on a 2.5 inch Prodex single screw extruder with a 30:1 L/D double wave screw. On the other hand, a twin extrusion machine, e.g. a 28 mm Werner Pfleiderer machine can be fed with resin and additives at the feed port and the triglycidyl isocyanurate treated glass fiber reinforcing agent downstream.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, and conventional mold temperatures.

EXAMPLES

The following examples illustrate the present invention. They are not to be construed to limit the claims in any manner whatsoever. All compositional data are in weight percent unless otherwise indicated.

Examples of the invention E3, E4, E7 and E8 were prepared by blending all ingredients (glass fibers added last to aid handling) and extruding the mixture on a 2.5 in. single screw extruder, 30:1 l/d at 460°14 480° F. at 100 rpm. The pelletized strand was dried and injection molded into test samples. Comparative examples C1, C2, C5, C6 and C9 were prepared under similar conditions. Tests were conducted according to ASTM procedures. Descriptions of resins, glass fibers, additives and test methods are given in Tables A-E.

The following set of abbreviations in Table A are used in the following examples and Tables.

TABLE A
GLASS FIBER DESCRIPTION

| | |
|---|---|
| FA = | A Bisphenol A epoxy sizing on G filament E glass. |
| FB = | A Bisphenol A epoxy sizing on G filament E glass. |
| FC = | TGIC, amino trialkoxy silane with film former on G filament E glass. |
| FD = | A Bisphenol A epoxy sizing on K filament E glass. |
| FE = | TGIC and amino trialkoxy silane on G filament E glass. |

FA, FB and FD are conventional glass fiber reinforcing agents. FC and FE are glass fiber reinforcing agents used in the compositions of the present invention.

TABLE B
COPOLYETHERESTER RESIN DESCRIPTION

| | |
|---|---|
| LB 5013 = | LOMOD ® B 5013 resin - GE Plastics (Polytetramethylene oxide type) |
| LB 1013 = | LOMOD ® B 1013 - GE Plastics (polytetramethylene oxide type) |
| LJ 5013 = | LOMOD ® J 5013 - GE Plastics (polypropylene oxide type) |
| HY 4056 = | HYTREL ® 4056 resin - E.I. DuPont Co. (polytetramethylene oxide type) |

TABLE C
POLYESTER RESIN DESCRIPTION

| | |
|---|---|
| PBT 295 = | VALOX ® 295 - GE Plastics |
| PET = | High MV reclaimed bottle regrind |

TABLE D
ADDITIVES DESCRIPTION

| | |
|---|---|
| Release Agent = | Pentaerythritol tetra stearate |
| Irganox ® 1076 = | Hindered phenol antioxidant - Ciba Geigy Co. |

TABLE E
PROPERTIES

| | |
|---|---|
| NI = | Notched Izod Impact Strength (ft. lbs./in.), as measured by ASTM D256. |
| UNI = | Unnotched Izod Impact Strength (ft. lbs./in.), as measured by ASTM D256. |
| TS = | Tensile Strength (Kpsi), as measured by ASTM D638 using 2.5 × ⅛" bars. |

TABLE E-continued
PROPERTIES

| | |
|---|---|
| FS = | Flexural Strength (Kpsi), as measured by ASTM D790. |
| SG = | Specific Gravity in g/cc. |
| MV = | Melt Viscosity at 265° C. in poise as measured using a 4900 g load and a 0.825 in. orifice. |
| HDT = | Heat Distortion Temperature as measured in °F. at 264 psi. ASTM D648. |

| | EXAMPLES | | | | | | |
|---|---|---|---|---|---|---|---|
| | C1 | C2 | E3 | E4 | C5 | C6 | E7 |
| LB 5013 | 70.0 | 70.0 | 70.0 | — | — | — | — |
| LB 1013 | — | — | — | 70.0 | 70.0 | 70.0 | 35.0 |
| PBT 295 | — | — | — | — | — | — | 35.0 |
| FD | 30.0 | — | — | — | — | 30.0 | — |
| FA | — | 30.0 | — | — | 30.0 | — | — |
| FE | — | — | — | — | — | — | 30.0 |
| FC | — | — | 30.0 | 30.0 | — | — | — |
| NI (ft.lbs./in.) | 3.5 | 4.1 | 4.3 | 9.0 | 9.3 | 8.7 | 4.5 |
| UI (ft.lbs./in.) | 14.9 | 18.9 | 20.8 | NB | NB | NB | — |
| TS (Kpsi) | 8.7 | 9.8 | 10.5 | 6.2 | 5.2 | 4.5 | 10.5 |
| FS (Kpsi) | 14.2 | 15.9 | 17.8 | 6.8 | 6.1 | 5.5 | 15.8 |

| | EXAMPLES | |
|---|---|---|
| | E8 | C9 |
| PBT 295 | 31.6 | 31.6 |
| PET | 18.0 | 18.0 |
| HY 4056 | 20.0 | 20.0 |
| FC | 30 | — |
| FB | — | 30 |
| Release Agent | 0.25 | 0.25 |
| Irganox ® 1076 | 0.15 | 0.15 |
| MVF 265° C., poise | 6800 | 6600 |
| HDT °F. | 367 | 376 |
| NI ft-lb/in | 3.1 | 2.7 |
| UNI ft-lb/in | 22.4 | 17.4 |
| TS kpsi | 13.7 | 13.9 |
| FS kpsi | 22.5 | 22.0 |
| FM kpsi | 790 | 800 |

NB means no break of the test piece during impact testing. Examples prefaced by a "C" are comparative examples. Examples prefaced by an "E" are examples of the present invention. Note the superior properties of example E3 over examples C1 and C2. Note the superior properties of E4 over examples C5 and C6. Note the superior properties of E8 over C9.

What is claimed:

1. A thermoplastic resin composition comprising:
   (a) a copolyetherester resin; and
   (b) a glass fiber reinforcing agent treated with a sizing agent comprising an epoxy functional cyanurate or isocyanurate.

2. The composition of claim 1 wherein said copolyetherester resin consists essentially of:
   (a) long-chain ester units having the formula:

wherein G is the divalent radical remaining after removal of the terminal hydroxyl groups from a poly(alkylene oxide) glycol having a number-average molecular weight of about 400 to about 6000; and R is the divalent radical remaining after removal of the carboxyl groups from a dicarboxylic acid; and
   (b) short-chain ester units having the formula:

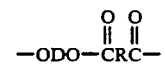

wherein D is the divalent radical remaining after removal of the hydroxyl groups from a low molecular weight diol having a molecular weight of less than about 250; and R is as defined above; with the proviso that the short-chain ester units constitute about 40% to about 90% by weight of the polyether-ester, and the long-chain ester units constitute about 10% to about 60% by weight of the copolyether-ester.

3. The composition of claim 1 wherein said composition further comprises a poly(1,4-butylene terephthalate) resin.

4. The composition of claim 1 wherein said composition further comprises a poly(ethylene terephthalate) resin.

5. The composition of claim 2 wherein said glass fiber reinforcing agent comprises glass fibers having filament lengths of from about 0.000005 to about 0.125 inch and diameters ranging from about 5 to about 15 microns.

6. The composition of claim 2 wherein said glass fiber reinforcing agent is present in an amount of from 1 to about 60 weight percent based on the total weight of said composition.

7. The composition of claim 2 wherein said glass fiber reinforcing agent is present in an amount of from 25 to about 40 weight percent based on the total weight of the composition.

8. The composition of claim 2 wherein said sizing agent consists essentially of triglycidyl isocyanurate.

9. The composition of claim 1 wherein said sizing agent is present in an mount of from about 0.1 to about 2.0 weight percent based on the weight of glass fiber reinforcing agent.

10. A thermoplastic resin composition consisting essentially of;
(a) a copolyetherester resin; and
(b) a glass fiber reinforcing agent treated with a sizing agent comprising an epoxy functional cyanurate or isocyanurate.

11. A thermoplastic resin composition comprising:
(a) a copolyetherester resin present at a level of from 40% to 99% by weight based on the total weight of the composition; and
(b) a glass fiber reinforcing agent treated with a sizing agent selected from the group consisting of epoxy isocyanurate, difunctional epoxy cyanurate and trifunctional epoxy cyanurate, said glass fiber reinforcing agent being present at a level of from 1% to 60% by weight based on the total weight of the composition, said sizing agent being present at a level of from 0.01% to 2.0% by weight based on the total weight of said glass fiber reinforcing agent.

12. The composition of claim 1 wherein said glass fiber reinforcing agent comprises glass fibers having filament lengths of from 0.005 inch to 0.125 inch and diameters ranging from 5 to 15 microns.

13. The compositions of claim 11 wherein said copolyetherester resin is present at a level of from 60% to 90% by weight based on the total weight of the composition, said reinforcing agent being present at a level of from 10% to 40% by weight based on the total weight of the composition.

14. The composition of claim 11 wherein said copolyetherester resin consists essentially of:
(a) long-chain ester units having the formula:

wherein G is the divalent radical remaining after removal of the terminal hydroxyl groups from a poly(alkylene oxide) glycol having a number-average molecular weight of about 400 to about 6000; and R is the divalent radical remaining after removal of the carboxyl groups from a dicarboxylic acid; and (b) short-chain ester units having the formula:

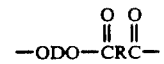

wherein D is the divalent radical remaining after removal of the hydroxyl groups from a low molecular weight diol having a molecular weight of less than about 250; and R is as defined above; with the proviso that the short-chain ester units constitute about 40% to about 90% by weight of the polyether-ester, and the long-chain ester units constitute about 10% to about 60% by weight of the copolyether-ester 15. The composition of claim 1 wherein said copolyetherester resin is a copolyetherimide ester resin.

16. The composition of claim 11 wherein said copolyetherester resin is a copolyetherimide ester resin.

17. The composition of claim 1 wherein said composition further comprises a crystalline polyester.

* * * * *